(No Model.) 3 Sheets—Sheet 3.
F. W. BURR & O. A. SMITH.
CORN CUTTER AND SHOCKER.
No. 266,764. Patented Oct. 31, 1882.
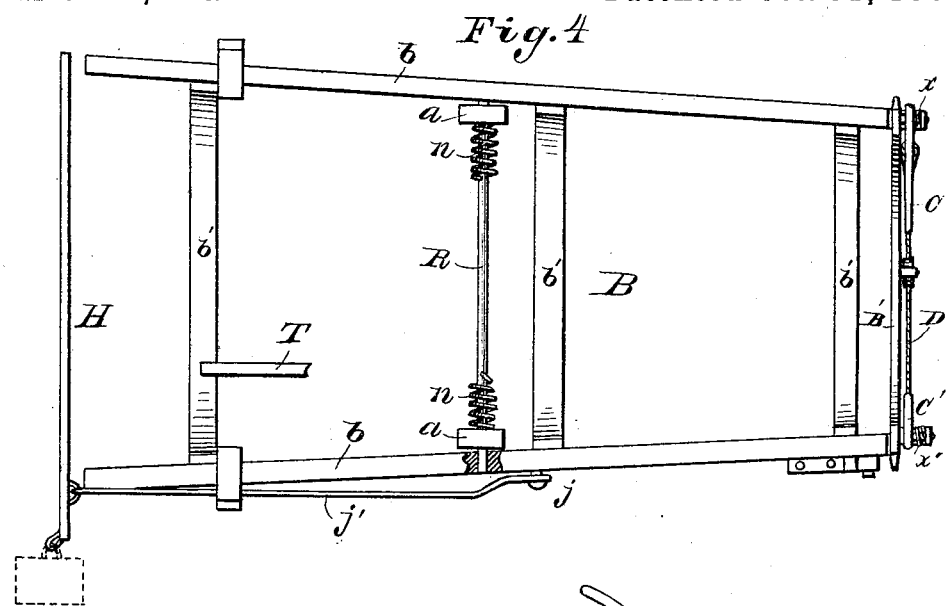
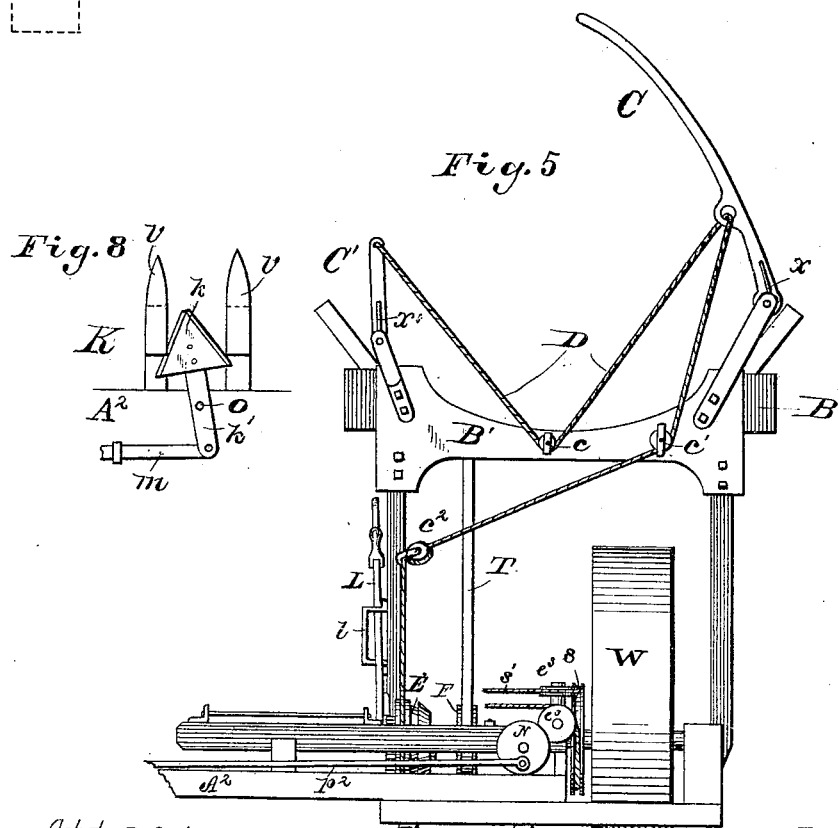

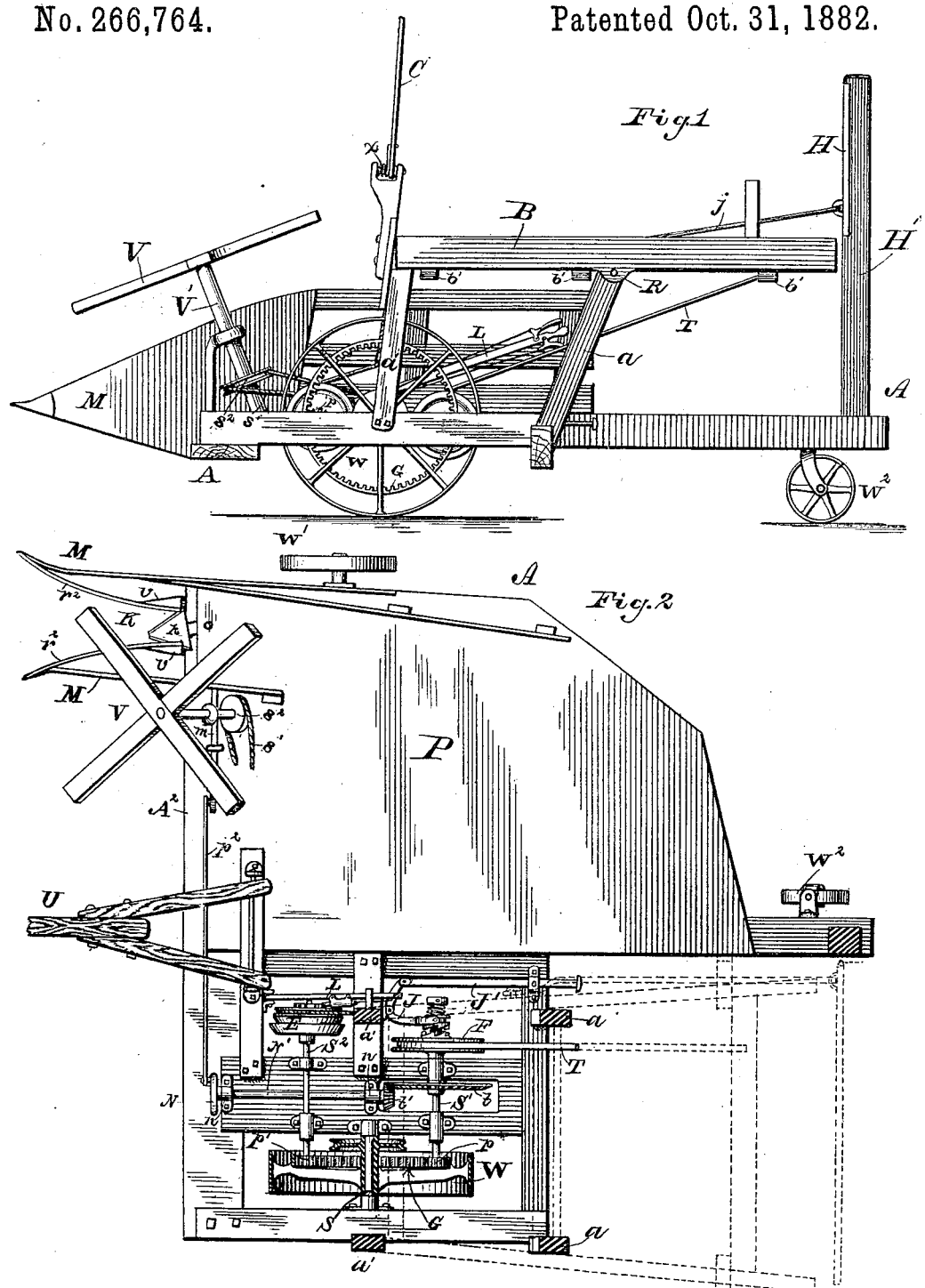

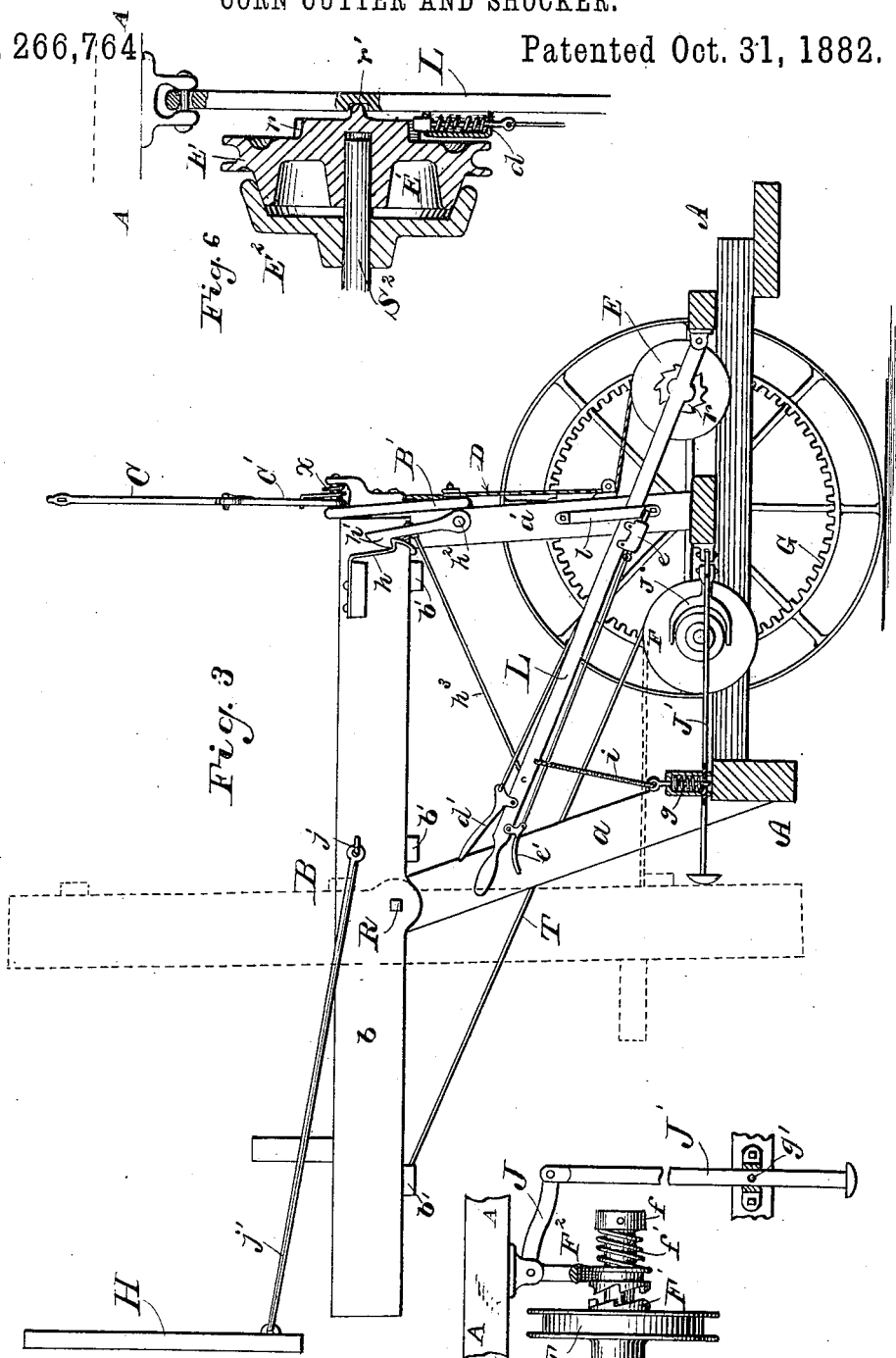

UNITED STATES PATENT OFFICE.

FRANK W. BURR AND ORVIL A. SMITH, OF LAFOX, ILLINOIS.

CORN CUTTER AND SHOCKER.

SPECIFICATION forming part of Letters Patent No. 266,764, dated October 31, 1882.

Application filed July 20, 1882. (No model.)

*To all whom it may concern:*

Be it known that we, FRANK W. BURR and ORVIL A. SMITH, citizens of the United States of America, residing at Lafox, in the county of Kane and State of Illinois, have invented an Improvement in Corn Cutters and Shockers, of which the following is a specification, to wit:

Our invention relates to a corn cutter and shocker.

The object of our invention is to provide a machine for cutting and shocking green or standing corn; and our invention consists in certain elements of mechanism and combinations thereof, as will be hereinafter fully described with reference to the accompanying drawings, in which—

Figure 1 is an end elevation of our improved corn cutter and shocker; Fig. 2, a plan view of the same, shown partly in section. Fig. 3 is a side elevation of the shocking and dumping arrangement. Fig. 4 is a plan view, and Fig. 5 a front elevation, of the same. Figs. 6 to 8, inclusive, are detailed views of some of the various parts, more particularly referred to hereinafter.

Similar letters refer to similar parts throughout the several views.

In the said drawings, A A designate the main frame of the machine, which is supported on a master-wheel, W, and two smaller wheels, W' and W$^2$. The master-wheel W turns on a shaft, S, supported at each end in suitable bearings on the main frame A A, and is provided with an internal gear, G, into which mesh on opposite sides pinions $p$ $p'$, respectively secured on the ends of the shafts S' and S$^2$, journaled in suitable bearings on the main frame A A. Supported over the master-wheel W on the posts $a$ $a$ $a'$ $a'$ on the main frame A A is what we term the "table" B, which consists properly of a frame formed by side pieces, $b$ $b$, and cross-pieces $b'$ $b'$ $b'$, and hung in the middle on a rod, R, journaled in the top of the posts $a$ $a$, and provided near each end with a spring, $n$, one end of each of which is attached to the rod and the other to posts $a$ $a$. (See Fig. 4.) The upper ends of the posts $a'$ $a'$ are connected by a frame-piece, B', on the ends of which are pivoted arms C and C', the longer one of which, C, we term the "compress-arm."

To the shorter arm, C', is attached the end of a rope or cable, D, which passes down and under a small pulley, $c$, thence up and through an eye, $c'$, in the compress-arm C, thence downward through small pulleys $c^2$ $c^3$ to a grooved wheel or reel, E, on the shaft S$^2$. This wheel E, which runs loosely on the inner end of shaft S$^2$, is provided on one side with a ratchet, $r$, and on the other with a friction-cone, E', which fits in the frictional cone-wheel E$^2$, secured to the shaft S$^2$ and revolving therewith. (See Fig. 6 for detail.) The wheel E is further provided on the side having the ratchet $r$ with a projection, $r'$, which works in a recess in a lever, L, pivoted to the frame A A in such a manner that it is capable of either a vertical or lateral movement. This lever is provided on the inner side with a spring bolt or pawl, $d$, which engages with the ratchet $r$ on the wheel E, as and for the purpose hereinafter more fully set forth, and is connected to and controlled by a hand-clip, $d'$. Said lever is further provided with a spring-bolt, $e$, connected to and controlled by a hand-clip, $e'$, which catches under a loop, $l$, on the post $a'$, through which the lever passes, and thus holds said lever from moving vertically until released.

Placed loosely on the shaft S', near its inner end, is a wheel, F, provided on one side with a clutch, F', corresponding with the face of a clutch-collar, F$^2$, secured on the shaft S' in such a manner that it turns with said shaft, but is free to move longitudinally thereon. On the shaft S', with one end resting against the clutch-collar F$^2$ and the other against a fixed collar, $f$, is a spring, $f'$, which tends to press the clutch-collar F$^2$ into contact with the clutch F' on the wheel F, which is, however, held away by the bell-crank clutch-lever J, pivoted to frame A A, and connected to a push-rod, J', held by a spring-bolt, $g$, which enters into a hole, $g'$, in said push-rod J', and thus holds the several parts in their normal position.

To the periphery of the wheel F, which is provided with suitable flanges, is attached one end of a strap, T, secured at its other end to cross-piece $b'$ at the rear end of table B.

On the inner side of the table B, at the forward end, is a spring-catch, $h$, which engages with a hook or catch, $h'$, pivoted at $h^2$ to the post $a'$, and connected by a rod, $h^3$, to the hand-lever L. The spring-bolt $g$ is also connected to the hand-lever L by a chain, $i$.

H is what we term the "butt-board," hinged to an upright post, H', on the rear end of the main frame A A, and extending across the rear end of the table B, and connected to one of the side pieces $b$ thereof at a point, $j$, beyond the center, by a rod, $j'$.

K is the cutting mechanism, (shown in detail in Fig. 8,) which consists of a knife, $k$, secured on the end of a vibrating lever, $k'$, pivoted at $o$ to the finger-bar $A^2 A^2$, and connected at its inner end to a sliding bar, $m$, which is reciprocated from a crank, N, on the end of a shaft, N', by a pitman, $p^2$. The shaft N' runs in bearings $n'$ on the main frame A A, and is rotated from the shaft S by means of a bevel-gear, $t$, and pinion $t'$. The knife $k$ is similar in shape to the sections of a mower or reaper knife, but considerably larger, and vibrates between the guards $v\ v$.

M M are the dividers, from the point of each of which extends a rod, $r^2$, to the guards $v\ v$, and brings all the corn in the row into the cutter K.

V is the reel, which is journaled in suitable bearings on the frame A A, and revolved from a pulley, $s$, on the inner end of the master-wheel W by a belt, $s'$, which passes over the loose pulleys $e^3 e^3$, and from thence around a pulley, $s^2$, on the reel-shaft V'.

U is the tongue, and P the platform.

The operation is as follows: The machine is to be drawn by horses hitched to the tongue U in the ordinary manner, and driven so that the last row of corn will enter between the dividers M M, where it is caught by the reel V and pressed toward the cutter K, where it is cut off and falls on the platform P. The operator, who stands upon the platform P, then picks it up and places it upon the table B, with the butts against the butt-board H. When a sufficient quantity has been placed upon the table to form a shock the operator presses the lever L laterally with his knee, which forces the friction-cone E' into the frictional cone-wheel $E^2$ on the shaft $S^2$, which is continually revolved by the pinion $p'$ meshing with the internal gear, G, on the master-wheel W. This sets the wheel E to revolving, which winds up the cable D, and compresses the bundle of corn by drawing down the arm C. The bundle, when sufficiently compressed, is held in this position by means of the spring-bolt $d$ engaging with the ratchet $r$ on the wheel E until the bundle is tied or bound with cord or wire. The end of the cord or wire with which the binding is done may be passed through an eye in the end of the arm C, and be placed automatically around the bundle as it is being compressed, the ends of the band being united and cut off by hand; or suitable mechanism may be provided whereby the complete operation of binding may be automatically performed. The bundle having been properly bound, the wheel E is released by withdrawing the spring-bolt $d$ from the ratchet $r$ by means of the hand-lever $d'$, and the arms C and C' are returned to their former positions by means of springs $x\ x'$, with which they are provided. The bundle being now properly bound, the operator takes hold of the hand-lever L, withdraws the spring-bolt $e$ from the loop $l$ by means of the hand-lever $e'$, and then raises the lever L vertically, which, through the medium of the rod $h^3$, disengages the hook $h'$ and spring-catch $h$, and at the same time, by means of the chain $i$, withdraws the spring-bolt $g$ from the push-rod J, thus releasing the clutch-collar $F^2$, which is pressed by the spring $f'$ into contact with the clutch F' on the wheel F, starting said wheel F to rotating and winding up the strap T thereon, which turns the table B on the rod R to the position shown in the dotted lines, Fig. 3, setting the shocks fairly on the ground, at the same time, by means of the rod $j$, turning back the butt-board H. The side piece $b$ of the table B, striking the end of the push-rod J, forces it in and, through the bell-crank clutch-lever, withdraws the clutch-collar $F^2$, releasing the wheel F. The spring-bolt $g$ engages and holds the push-bar J—the lever L having been returned to its former position by the operator—and the table B is returned to its former position by the springs $n\ n$. The spring-catch $h$ re-engages with the hook $h'$, and the operation is repeated.

Having thus described our invention, what we claim as new and original, and desire to secure by Letters Patent, is—

1. The combination of a butting-board, a dumping-table, a catch for holding said table in its normal position, a wheel mounted loosely on a revolving shaft, a clutch mechanism, a lever, and suitable connections whereby the catch for holding the table may be disengaged and the clutch mechanism thrown into gear for the purpose of turning said table, substantially as described.

2. The dumping-table B, strap T, and wheel F, provided with a clutch mechanism for connecting it with a revolving shaft, in combination with an arrangement for automatically disengaging said clutch when the table has reached the limit of its stroke, substantially as described and shown.

3. The combination of the table B, wheel F, and means of connecting the same with the clutch mechanism F' $F^2$, clutch-lever J, and push-rod J', substantially as shown and described.

4. The combination of the wheel F, clutch F' $F^2$, clutch-lever J, spring $f'$, push-rod J', spring-bolt $g$, and lever L, in combination with the table B, substantially as described and shown.

5. The combination of the table B, strap T, wheel F, clutch F' $F^2$, spring $f'$, clutch-lever J, push-rod J', spring-bolt $g$, lever L, catch $h'$, and connections $i$ and $h^3$, substantially as shown and described.

6. The combination of the arms C and C', having springs $x\ x'$, rope D, wheel E, friction-cones E′ E², revolving shaft S², and lever L, substantially as described and shown.

7. In a corn cutter and shocker, a compress-arm and rope, in combination with a wheel on which said rope is wound placed loosely on a revolving shaft, and arranged to be connected and revolved therewith by friction-cones, and provided with a ratchet for holding it at any desired point, substantially as shown and described.

8. The combination of the arms C and C′, having springs $x\ x'$, rope D, wheel F, friction-cones E′ E², shaft S², ratchet $r$, lever L and spring-bolt $d$, substantially as described and shown.

In testimony whereof we affix our signatures in presence of two witnesses.

FRANK W. BURR.
ORVIL A. SMITH.

Witnesses:
L. M. POTTER,
ORVILLE SHELDON.